United States Patent Office
3,140,456
Patented July 7, 1964

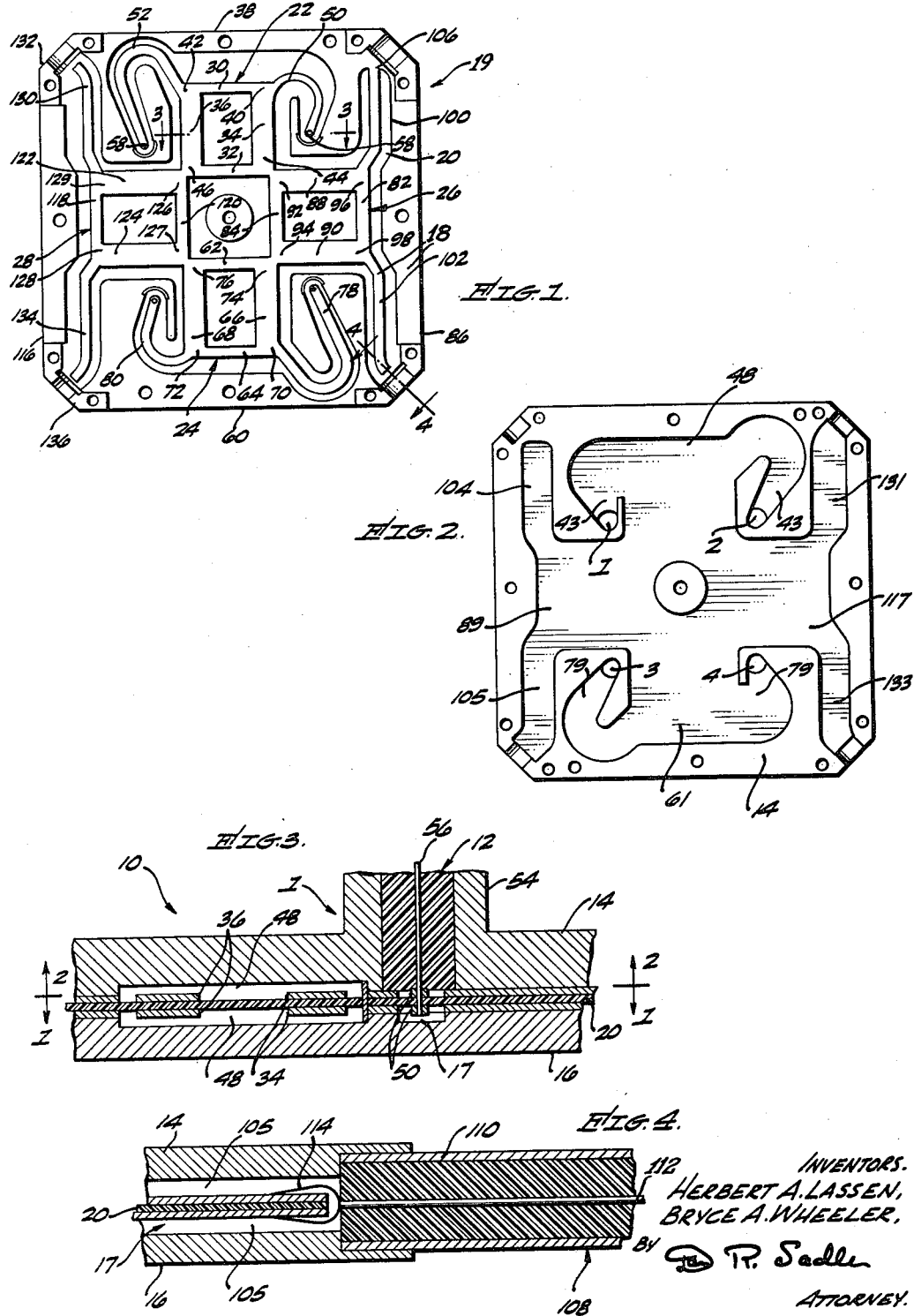

3,140,456
MICROWAVE SUMMING AND DIFFERENCING NETWORK UTILIZING STRIPLINE CROSS COUPLER
Herbert A. Lassen and Bryce A. Wheeler, Los Angeles, Calif., assignors to Hughes Aircraft Company, Culver City, Calif., a corporation of Delaware
Filed Aug. 24, 1959, Ser. No. 835,801
10 Claims. (Cl. 333—9)

The present invention relates to microwave devices and more particularly to a summing and differencing network for use in microwave systems.

Microwave systems frequently have a plurality of separate signals that contain useful information. For example, in a monopulse radar system, the receiving antenna develops separate signals indicative of the quadrant in which the reflecting target is located. However, in order to utilize this information it may be necessary to combine the various signals into different groups and then obtain the sum and/or differences between the groups. One conventional means for accomplishing this is to employ waveguides that are interconnected into various combinations of hybrid junctions or magic tees so as to add and subtract the various input signals and thereby obtain one or more signals representing the required sums and differences. A device of this nature is a complex structure which has an appreciable physical size. This not only results in an expensive device but also because of the size and necessary geometrical arrangement of the structural elements the signals are inherently subjected to relative phase shifts and other distortions. It may thus be seen that it is frequently extremely difficult if not impossible to preserve the characteristics of the signals so as to permit the obtaining and utilizing of the desired information.

It is therefore an object of the present invention to provide a summing and differencing network for use in microwave systems that is not only lighter and more compact but can also be more inexpensively built.

It is an additional object to provide a microwave summing and differencing network that forms a comparatively thin plane structure.

It is also an object to provide a microwave summing and differencing network that is so constructed that the true characteristics of the signals may be easily preserved.

These and other objects are to be accomplished by providing a summing and differencing network comprising one or more ground plane conductors and a line conductor that is disposed therebetween. In the present instance, the line conductor is disposed on the surface of a dielectric sheet that is clamped between the two ground conductors. The line conductor cooperates with the surfaces of the ground planes to acts as a stripline device for carrying microwave signals. This may be divided into two pairs of input cross couplers and two pairs of output cross couplers that are interconnected with each other in a predetermined relation. The two input couplers are adapted to receive at least four separate microwave signals and to combine them into various combination signals. These signals are then fed into the output couplers where they are further combined to produce separate output signals. Due to the characteristics of the couplers and the arrangement thereof, one of these output signals may be made to represent the difference between two groups of input signals while another of the output signals may be made to simultaneously represent the difference between two other groups of input signals. In addition, if desired, another output signal may be provided that represents the total of all of the input signals so as to provide a reference level against which the difference signals may be compared.

In the drawings:
FIGURE 1 is a cross-sectional view of a summing and differencing network embodying the present invention and is taken substantially along the plane of line 1—1 in FIG. 3 and looking in the direction of the arrows;
FIGURE 2 is a cross-sectional view of the network taken substantially along the plane of line 2—2 in FIG. 3 and looking in the direction of the arrows;
FIGURE 3 is a transverse cross-sectional view on an enlarged scale of a summing and differencing network taken substantially along the plane of line 3—3 in FIG. 1; and
FIGURE 4 is a transverse cross-sectional view on an enlarged scale taken substantially along the plane of line 4—4 in FIGURE 1.

Referring to the drawings in more detail, the present invention is embodied in a summing and differencing network 10. This network includes four separate input connections 1, 2, 3 and 4, one of which is illustrated in detail in FIG. 3. Each of these connections is adapted to be interconnected with a separate signal source such as a coaxial cable so as to receive separate microwave signals from a microwave system.

Thus the summing and differencing network 10 will receive four separate microwave signals $S_1$, $S_2$, $S_3$ and $S_4$ from four separate coaxial transmission lines such as the line 12. Although each of these signals $S_1$, $S_2$, $S_3$ and $S_4$ may contain some form of intelligence, in the present instance it is desired to utilize the information represented by the difference between the sum of signals $S_1$ and $S_2$ and the sum of signals $S_3$ and $S_4$. It is also desirable to simultaneously obtain the difference between the sum of signals $S_1$ and $S_3$ and the sum of signals $S_2$ and $S_4$.

The present summing and differencing network 10 comprises a relatively thin plane structure that includes a pair of metallic ground plates or conductors 14 and 16 and a center conductor assembly 19 comprising conductive patterns 18 that are supported by a sheet 20 of dielectric material compressed between the ground conductors 14 and 16.

The registering surfaces of the ground plates 14 and 16 are relieved to create channels that are arranged into predetermined patterns that will register and thus form passages 17. The line or center conductor assembly 19 includes thin layers of conductive material that are cut into predetermined patterns 18 corresponding to the relieved patterns of passages 17 on the faces of the ground plates 14 and 16 and are bonded or otherwise secured onto the opposite sides of the dielectric sheet 20. Each conductive pattern 18 is substantially identical to the other pattern 18 and includes a plurality of interconnecting conductive strips. The corresponding strips on the opposite sides of the sheet 20 register with each other. A portion of the registering strips will be positioned in the center of the passages 17 and form center conductors for carrying a current or microwave signal. This current will set up electric and magnetic fields between the portions of the conductive patterns 18 forming a center conductor and the surfaces of the passages 17. As a result the conductive patterns 18 and passages 17 will create a so-called stripline for carrying microwave signals. The current flowing through the adjacent or registering strips will produce a considerable amount of the electric and magnetic fields within the dielectric sheet 20. Accordingly, in order to reduce the attenuation of the signal the dielectric sheet 20 should be a material such as fiberglass, Kel-F, Teflon, quartz, etc., having a low loss in the microwave region.

The remaining portions of the conductive patterns 18 may be arranged to register with the unrelieved portions of the plates 14 and 16 and be compressed against the surfaces thereof. This facilitates controlling the spacing between the surfaces of the center conductor and the surfaces of the passages 17. The spacing will then be dependent on the depth to which the channels or passages 17 are cut. Consequently, several dimensional tolerances that would otherwise affect the spacing will be eliminated. In addition, the grounded strips will cooperate with the unrelieved portions of the ground plates 14 and 16 to form a shield effective to reduce the radiations from one conductor being absorbed in an adjacent conductor.

As previously stated, the conductive patterns 18 on the opposite sides of the dielectric sheet 20 are mirror images of each other and they are also aligned to register with each other and to cooperate with the ground plates 14 and 16 to form microwave conductive striplines. The pattern of these striplines may be divided into a pair of input cross couplers 22 and 24 and a pair of output cross couplers 26 and 28 that are interconnected with each other.

The first input cross coupler 22 includes a pair of narrow conductors 30 and 32 and a pair of wide conductors 34 and 36. The wide conductors 34 and 36 are parallel to each other and substantially normal to edge 38 of the dielectric sheet 20. The narrow conductors 30 and 32 are substantially parallel to each other and to the edge 38 of the sheet 20. The ends of the conductors are joined at four separate corners 40, 42, 44 and 46 whereby the conductors will be arranged in a square that fits into cooperating relieved portions 48 in the ground plates 14 and 16.

Two of the corners 40 and 42 of the coupler are located adjacent the edge 38 of the sheet 20 and have input conductor arms 50 and 52 interconnected therewith. The conductor arms 50 and 52 extend in arcuate paths from the corners 40 and 42 and terminate adjacent the input connectors 1 and 2, respectively. These connectors 1 and 2 are adapted to be connected to a signal source such as a coaxial transmission line 12 (FIG. 3). The outer conductors 54 of the coaxial lines 12 are connected to the ground plates 14 and 16. The inner conductors 56 thereof extend through openings 58 in the ends of the arms 50 and 52 and are electrically connected to the conductors 50 and 52 by soldering and riveting. The remaining two corners 44 and 46 of the square are located adjacent the center of the sheet 20. The arms 50 and 52 are disposed in the channels 43 in the ground plates 14 and 16 so as to act as stripline for carrying the input signals from the connectors 1 and 2 to the corners 40 and 42. It should be noted that by gradually varying the widths of the arms 50 and 52 the impedances may be gradually varied so as to match the network to the input lines.

The second input cross coupler 24 is substantially identical to the first input coupler 22 and is symmetrically located with respect thereto on the opposite side of the dielectric sheet 20 adjacent the edge 60 of the sheet 20. This coupler 24 includes two narrow conductors 62 and 64 and two wide conductors 66 and 68. The narrow conductors 62 and 64 are parallel to each other and to the edge 60 of the dielectric sheet 20 while the two wide conductors 66 and 68 are normal to the narrow sides 62 and 64. The conductors are interconnected with each other to form a square disposed in the relieved portions 61 and having two pairs of corners 70–72 and 74–76. The first pair of corners 70 and 72 is located adjacent the edge 60 of the dielectric sheet 20 and forms the inputs to the coupler 24. Conductor arms 78 and 80 are connected to the corners 70 and 72 and extend in arcuate paths so as to terminate adjacent the input connectors 4 and 3, respectively. These arms 78 and 80 are disposed in the channels 79 in the ground plates 14 and 16 so as to form stripline conductors for carrying signals from the input connectors 3 and 4 to the cross coupler 24. The other pair of corners 74 and 76 is located near the center of the sheet 20.

The first output cross coupler 26 includes a pair of narrow conductors 82 and 84 parallel to an edge 86 of the sheet 20 and to each other. In addition, there are a pair of wide conductors 88 and 90 that are connected to the conductors 82 and 84 to form a square disposed in relieved portion 89 and having a pair of input corners 92 and 94 adjacent the center of the sheet 20 and a pair of output corners 96 and 98. The input corners 92 and 94 are connected directly to the output corners 44 and 46, respectively, of the input cross couplers 22 and 24. The output corners 96 and 98 are located adjacent the edge 86 of the sheet 20 and have conductive output arms 100 and 102 connected thereto. The first arm 100 cooperates with channels 104 in the ground plates 14 and 16 and extends toward a corner of the dielectric sheet 20 for connection to a suitable terminating load such as the ground plates at the point 106. The other arm 102 registers with the channels 105 and extends toward a corner of the dielectric sheet 20 for interconnection with an output connector such as the coaxial transmission line 108. The outer conductor 110 of the line 108 is suitably connected to the ground plates 14 and 16 by clamping therebetween. The center conductor 112 has a clip 114 secured onto the end thereof that extends over the exteriors of the arm 102 so as to be electrically connected thereto.

The remaining output coupler 28 is substantially identical to the first output coupler 26 and is symmetrically located with respect thereto on the opposite side of the sheet 20 adjacent the edge 116 so as to register with the relieved portions 117. This coupler 28 includes two narrow conductors 118 and 120 parallel to each other and to the edge 116 and two wide conductors 122 and 124 normal to the narrow conductors 118 and 120. These conductors are connected together to form a pair of input corners 126 and 127 and a pair of output corners 128 and 129. The input corners 126 and 127 are disposed adjacent the center of the sheet 20 and are connected directly to the output corners 46 and 76 of the input couplers 22 and 24. A conductive output arm 130 extends from the corner 129 through the channels 131 toward the corner 132 of the sheet 20 so as to be connected to a suitable coaxial output cable by a connection similar to the connection illustrated in FIG. 4. The other corner 128 also has a conductive output arm 134 connected thereto. This arm is disposed in channels 133 and extends toward a corner 136 of the dielectric sheet 20. The end of this arm 136 is also adapted to be interconnected with a suitable coaxial output cable by means similar to those illustrated in FIG. 4.

It will thus be seen that each of the couplers 22, 24, 26 and 28 comprises a plurality of conductors formed by the conductive strips bonded onto the opposite sides of the dielectric sheet 20. Each coupler has the conductors arranged into squares having two wide conductors and two narrow conductors joined together at two corners adjacent an outer edge of the sheet and two corners adjacent the center thereof.

The lengths of the input arms 50, 52, 78, and 80 are not critical. However, in the present instance, the first input arm 50 has an electrical length equal to substantially one-quarter of a wavelength of the input signals while the second arm 52 has a length substantially equal to one-half a wavelength long. Thus if two signals $S_1$ and $S_2$ are supplied to the input connectors 1 and 2, respectively, and in phase with each other, the extra length of the second arm 52 will cause the two signals to be ninety degrees out of phase when they arrive at the corners 40 and 42. Thus the signals fed into the coupler 22 at the corners 40 and 42 may be designated by $S_1 \angle 90°$ and $S_2 \angle 0°$ wherein the angles represent the phase angles of the signals. The phase angles indicated in the remaining portions of the application will be measured from the time that the signal $S_2$ reaches the corner 42.

Preferably, each side of the squares has an electrical length which is equal to some predetermined fraction of the wavelength of the input signals so as to produce a predetermined phase delay whenever a signal travels the length thereof. In the present instance, each side is a quarter wavelength long and thereby produces a ninety degree phase delay whenever a signal travels from one corner to an adjacent corner.

Thus it may be seen that if two signals arrive at the input connectors 1 and 2 in phase with each other, the signal $S_1$ from the first connector 1 will be subjected to a ninety degree phase delay before arriving at the first corner 40, and the signal $S_2$ from the second input connector 2 will be subjected to a one hundred eighty degree delay in the input arm 52 and a ninety degree delay in the side 30. Thus the signals at the corner 40 will include $S_1 \angle 90°$ and $S_2 \angle -90°$ which are one hundred eighty degrees out of phase. The first signal $S_1$ and the second signal $S_2$ will be differentially combined at this corner 40. However, at the same time the first signal $S_1$ will experience ninety degrees delays in the arm 50 and the side 30 while the second signal will be delayed one hundred eighty degrees by the arm 52. Thus the signals present at the corner 42 will include $S_1 \angle 0°$ and $S_2 \angle 0°$. Consequently, they will be additively combined at corner 42.

Since all of the conductors 30, 32, 34 and 36 have the same thickness, the relative impedances of the sides will be determined by the widths thereof and the narrow sides will have a greater impedance than the wide sides. The power flowing from the conductive arm 50 will divide at the corner 40 and the separate components will circulate around the coupler 22 in opposite direction. The first component of signal $S_1$ will flow directly along the side 34 to the corner 44 with a ninety degree phase delay and will thus have a phase angle of zero ($S_1 \angle 0°$). The other component of the signal $S_1$ will travel through the sides 30, 36 and 32 to the corner 44 and will have a two hundred seventy degree delay so that it will have a phase angle of one hundred eighty degrees ($S_1 \angle 180°$). Thus the two different parts of signal $S_1$ will be one hundred eighty degrees out of phase and will tend to be self-canceling at corner 44. However, by a proper proportioning of the widths of the conductive sides of the square, the greater attenuation of the component having the greater phase delay will be such that there will not be a complete cancellation of the two components. Instead, there will remain at the corner 44 a component $S_1 \angle 0°$ having an amplitude proportional to the input signal $S_1$ supplied to the input connector 1.

The portion of the signal $S_1$ traveling along sides 34 and 32 will arrive at corner 46 after a one hundred eighty degree delay $S_1 \angle -90°$. The other portion of the signal $S_1$ traveling along sides 30 and 36 will also arrive at corner 46 with a one hundred eighty degree delay $S_1 \angle -90°$. Thus the two components will be in phase at this corner so as to reinforce each other and produce a signal $S_1 \angle -90°$ that is proportional to the input signal.

A similar analysis of the circulation of the signal around the coupler 22 will reveal that there will be signals $S_2 \angle 180°$ and $S_2 \angle -90°$ present at the corners 44 and 46, respectively.

Thus the signals $S_1 \angle -90°$ and $S_2 \angle -90°$ at the corner 46 will be in phase and additively combined with each other. This combination signal representing the sum of the two signal $S_1$ and $S_2$ will then be supplied to corner 126 with a phase angle of $-90°$. The signals $S_1 \angle 0°$ and $S_2 \angle 180°$ present at corner 44 will be one hundred eighty degrees out of phase with each other and will be differentially combined. This combination signal representing the difference between the signals $S_1$ and $S_2$ will be supplied to corner 92 and will circulate through the coupler 26.

The signal $S_3$ from the input 3 will enter the arm 78 and flow to the corner 70 where it will enter the coupler 24 and circulate therein. The length of the arm 78 is preferably one-half a wavelength long so that if the signal $S_3$ at the input connection 3 is in phase with signals $S_1$ and $S_2$ at the input connections 1 and 2 it will be apparent as $S_3 \angle 0°$ at the corner 70. It may be shown that this signal will be present at corner 74 as $S_3 \angle -90°$ and at corner 76 as $S_3 \angle -180°$.

The signal $S_4$ from the input connection 4 will be carried along input arm 80 and enter the coupler 24 at corner 72. This arm 80 is preferably one-quarter wave long and the signal $S_4$ is preferably one hundred eighty degrees out of phase with the first signals $S_1$, $S_2$ and $S_3$. This may be accomplished by reversing the polarities of the currents on the inner and outer conductors of the coaxial input cable. This signal will be supplied to the corner 72 with a phase angle of minus ninety degrees. This will then circulate throughout the coupler 24 and appear at corners 74 and 76 as $S_4 \angle 90°$ and $S_4 \angle 180°$, respectively.

It may thus be seen that the signals $S_3 \angle -90°$ and $S_4 \angle 90°$ at corner 74 will be one hundred eighty degrees out of phase with each other and will be differentially combined. The combination signal representing the difference between $S_3$ and $S_4$ will be fed to corner 94 and circulated throughout coupler 26. At the same time the signals $S_3 \angle 180°$ and $S_4 \angle 180°$ present at the corner 76 will be in phase and additively combined with each other. The resultant sum signal representing the sum of $S_3$ and $S_4$ will be supplied to corner 127 and thereby introduced into the coupler 28 so as to circulate throughout.

The difference signal $S_1 \angle 0°$ and $S_2 \angle 180°$ present at the corner 44 will divide at the corner 92 with one portion traveling along wide conductor 88 and the other portion traveling along narrow conductor 84. The signals traveling directly along wide conductor 88 will appear at corner 96 as signals $S_1 \angle -90°$ and $S_2 \angle 90°$. The portion of the signals traveling around the conductors 84, 90 and 82 will appear at corner 96 as $S_1 \angle 90°$ and $S_2 \angle 90°$. However, these latter signals will be sufficiently attenuated to prevent a cancellation of the signals and leave the difference signals $S_1 \angle -90°$ and $S_2 \angle 90°$. At the same time these signals will appear at the corner 98 as $S_1 \angle 180°$ and $S_2 \angle 0°$.

By a similar analysis, it will become apparent that the signals $S_3 \angle -90°$ and $S_4 \angle 90°$ are present at corner 74. These signals will divide at corner 94 and circulate around the coupler so as to appear at corner 98 as $S_3 \angle 180°$ and $S_4 \angle 0°$ and at corner 96 as $S_3 \angle 90°$ and $S_4 \angle -90°$.

It may thus be seen that the signals present at corner 96 will include $S_1 \angle -90°$, $S_2 \angle 90°$, $S_3 \angle 90°$ and $S_4 \angle -90°$. The signals $S_1 \angle -90°$ and $S_4 \angle -90°$ are in phase with each other and will thus be additively combined to produce a resultant signal having a phase angle of $-90°$. At the same time the signals $S_2 < 90°$ and $S_3 \angle 90°$ are also in phase with each other and will be additively combined to produce a second resultant signal having a phase angle of $90°$. Since these two resultant signals are one hundred eighty degrees out of phase with each other, they will be differentially combined so as to produce a composite signal. This composite signal will represent the difference between the sums of signals $S_1$ and $S_4$ and the sums of $S_2$ and $S_3$. This composite signal will travel from the corner 96 along the output arm 100. In the present instance, this signal does not contain any intelligence which it is desired to utilize. Accordingly, the arm 100 is terminated in a suitable load by interconnection with the ground plates 14 and 16 at points 106.

These signals while circulating around the coupler 26 will also appear at the corner 98 as $S_1 \angle 180°$, $S_2 \angle 0°$, $S_3 \angle 180°$ and $S_4 \angle 0°$. Due to their relative phase relationship these signals will combine and form a composite signal which represents the difference between the sum of signals $S_1 + S_3$ and the sum of $S_2 + S_4$. In other words, this signal will indicate whether the sum of the input signals to the connectors on the right side of the network are greater or less than the sum of the signals supplied to the input connectors on the left side of the network. Since in the present instance it is desirable to utilize this information, this signal is carried over conductor 102 to an output coaxial cable which is interconnected with a suitable utilizing device.

The signals $S_1 \angle -90°$ and $S_2 \angle -90°$ present at the corner 46 will enter the coupler 28 at the corner 126 and will circulate through the coupler 28. These signals will appear at the corner 129 as $S_1 \angle 180°$ and $S_2 \angle 180°$ and at the corner 128 as $S_1 \angle 90°$ and $S_2 \angle 90°$. Similarly, the signals $S_3 \angle 180°$ and $S_4 \angle 180°$ present at corner 76 will be fed to corner 127 and thereby circulated through the coupler 28. These signals will simultaneously appear at the corner 129 as $S_3 \angle 0°$ and $S_4 \angle 0°$ and at the corner 128 as $S_1 \angle 90°$ and $S_2 \angle 90°$.

It may be seen that the signals present at the corner 129 will include $S_1 \angle 180°$, $S_2 \angle 180°$, $S_3 \angle 0°$ and $S_4 \angle 0°$. Due to the relative phase relations of these signals, they will combine to produce a resultant signal representing the difference between the sum of $S_1$ and $S_2$ and the sum of $S_3$ and $S_4$. This difference will indicate whether the signals entering the two upper inputs is greater than or less than the signals entering the two lower inputs and by how much. Since this information is desired, the composite signal is fed into conductor 130 and carried to a suitable coaxial cable that leads to a utilizing device.

Simultaneously, at the corner 128, there will be signals $S_1 \angle 90°$, $S_2 \angle 90°$, $S_3 \angle 90°$ and $S_4 \angle 90°$. Since all of these signals are in phase with each other they will be additively combined to produce a signal representing the sum of all of the input signals supplied to the input connectors 1, 2, 3 and 4. This summation signal is fed into conductor 134 which in turn is connected to a coaxial cable leading to the utilizing device. This summation signal will provide a reference level against which the foregoing difference signals can be compared. Thus it will be possible to compensate for any fluctuations in the absolute amplitudes of the input signals and thereby insure a more accurate index of the differences between the input signals.

It may thus be seen that a summing and differencing network for use in the microwave region has been provided that is very compact and lightweight so that the network may be easily and economically produced. In addition, the network can be provided with a geometrical shape that will permit the input signals to be combined with each other with a minimum of phase or other distortions that might otherwise produce inaccuracies in the output signals.

We claim:

1. In a device of the class described, a conductive ground plane and a line conductor spaced therefrom, said line conductor comprising a pair of input cross couplers and at least one output cross coupler, each of said input couplers having a pair of separate input ports for receiving input signals and at least one output port for discharging a combined signal therefrom, said output cross coupler having a pair of separate input ports, each of which is interconnected with one of said outputs in each of said input couplers for receiving said combined signals, each of said output cross couplers including at least one output port for providing a signal representing the difference between the groups of said input signals.

2. In a device of the class described, a sheet of dielectric material, a pair of ground plane conductors disposed on opposite sides of said sheet, said conductors including portions for compressing said sheet therebetween and relieved portions spaced from the surfaces of said sheet, a line conductor on said sheet disposed to register with said relieved portions and thus be in spaced relation to said ground conductors, said line conductor forming a pair of input cross couplers and at least one output cross coupler, each of said input couplers having a pair of separate input ports for receiving input signals and at least one output port for supplying a combined signal therefrom, said output cross coupler having a pair of separate input ports, each of said last mentioned input ports being interconnected with one of said output ports for receiving said combined signals, said output cross coupler including at least one output port for supplying a signal representing the difference between two groups of said input signals.

3. A microwave summing and differencing network comprising, a conductive ground plane and a line conductor spaced therefrom, said line conductor comprising a pair of rectangular input cross couplers and at least one rectangular output cross coupler, each of said input couplers having a pair of separate input corners for receiving microwave input signals and at least one output corner for discharging a combined microwave signal therefrom, said output cross coupler having a pair of separate input corners each of which is interconnected with one of said output corners for receiving said combined signals, each of said output cross couplers including at least one output corner for providing a signal representing the difference between groups of said input signals.

4. A microwave summing and differencing network comprising a conductive ground plate and a parallel line conductor spaced therefrom, said line conductor including a first pair of cross couplers and a second pair of cross couplers, each of said couplers in said first pair having a pair of separate input ports for receiving separate microwave signals and a pair of output ports for discharging separate combined microwave signals, each of said couplers in said second pair having a pair of separate input ports and a pair of separate output ports, each of said input ports in said second pair of couplers being interconnected with one of said output ports in said first pair for receiving said combined signals therefrom, at least a portion of said output ports from said second pair of couplers being effective to produce signals indicative of the differences between two groups of said first microwave signals.

5. A microwave summing and differencing network comprising a sheet of dielectric material, a pair of conductive ground plates disposed on the opposite sides of said sheet, said plates including portions for compressing said sheet therebetween and relieved ports disposed in spaced relation to said sheet, a line conductor disposed on the surface of said sheet to register with said relieved portions and thus be in spaced relation to said ground plates, said line conductor including a first pair of cross couplers and a second pair of cross couplers, each of said couplers in said first pair having a pair of separate input ports for receiving separate microwave signals and a pair of output ports for discharging separate combined microwave signals, each of said couplers in said second pair having a pair of separate input ports and a pair of separate output ports, each of said input ports in said second pair of couplers being interconnected with one of said output ports in said first pair for receiving said combined signals therefrom, at least a portion of said outputs from said second pair of couplers being effective to produce signals indicative of the differences between groups of said first microwave signals.

6. A microwave summing and differencing network comprising a conductive ground plate and a parallel line conductor spaced therefrom, said line conductor including two pairs of quadrilateral cross couplers, each of the cross couplers in the first of said pairs having two corners that form separate inputs for receiving separate microwave signals, each side of said couplers having an electrical length substantially equal to an odd quarter wavelength of said microwave signals, each of the other corners in said first pair forming outputs containing combined signals, two of the corners in each of the cross couplers in the other of said pairs being separately connected to said outputs for individually receiving one of said combined signals, one of the remaining corners forming an output for providing a signal representing the difference between two groups of said input signals, another one of the remaining corners forming an output for providing a signal representing the difference between two other groups of said input signals.

7. In a microwave system, a summing and differencing network for producing signals indicative of the difference between different groups of input signals, said network comprising a conductive ground plane and a parallel line conductor, said line conductor including a pair of input cross couplers, each of said cross couplers including four sides interconnected to form a square wherein each side is substantially equal to one-quarter of the wavelength of said input signals, one pair of adjacent corners in each coupler being arranged to form separate inputs that are adapted to receive said input signals, the corners and sides of said couplers being positioned so that said input signals will be combined with predetermined relative phase shifts so as to produce separate combination signals in the remaining corners of said couplers, said line conductor including a pair of output cross couplers each of which includes four straight sides that are substantially one-quarter of a wavelength long and are interconnected to form a square, two corners in each of said output couplers being connected to said remaining corners of said inupt couplers for receiving said combination signals therefrom, the corners and sides of said output couplers being positioned so that said combination signals will be combined with predetermined relative phase shifts so as to provide output signals at some of the remaining corners of said output couplers that represent the differences between various sums of said inupt signals.

8. In a microwave system a summing and differencing network for producing signals indicative of the differences between different groups of input signals, said network comprising a pair of conductive ground planes and a sheet of dielectric material, said ground planes being disposed on the opposite sides of said sheet and having portions for compressing said sheet therebetween and unrelieved portions spaced from the surfaces of said sheet, a line conductor disposed on the surface of said sheet in spaced relation to said ground planes, said line conductor including two pairs of square input cross couplers, each of said cross couplers including four sides that are substantially equal to one quarter of the wavelength of said input signals, one pair of adjacent corners in each of said couplers being arranged to form separate inputs whereby each of said inputs is adapted to receive one of said microwave signals, said corners and sides being positioned so that said input signals will be combined with predetermined relative phase relations so as to produce separate combination output signals in the remaining corners of said couplers, said line conductor including a second pair of square cross couplers having four sides which are substantially one-quarter of a wavelength long and are interconnected to form two separate input corners and two separate output corners, said input corners being interconnected with the first group of output corners and at least a portion of said output corners in said second pair of couplers being arranged to supply signals representing the differences between said groups of input signals.

9. A summing and differencing network comprising a conductive ground plane and a line conductor disposed in parallel spaced relation thereto, said line conductor including a first pair of substantially straight parallel conductors that are spaced from said ground plane, the conductors in said pair being substantially three-quarters of a wavelength long and substantially one-quarter of a wavelength apart, one-quarter wavelength long connectors electrically interconnecting the adjacent ends of said conductors to form input corners for receiving separate microwave input signals, a second pair of parallel line conductors substantially three-quarters of a wavelength long spaced from said ground plane, said second pair of conductors intersecting said first conductors at substantially right angles and at substantially one-quarter of a wavelength from the ends, a second set of one-quarter wavelength long connectors electrically interconnecting the adjacent ends of said conductors in said second pair to form output corners for discharging separate microwave signals representing the differences between various sums of said input signals.

10. A microwave cross coupler comprising a dielectric support sheet, strips of conductive material disposed on both sides of said sheet aligned with each other to form conductors, a pair of ground plane conductors disposed on the opposite sides of said sheet in spaced relation to said line conductor, at least a portion of said line conductors being narrow and parallel to each other and at least a portion of said conductors being wide and parallel to each other, said narrow and wide conductors being interconnected to form a square having two corners for receiving microwave signals and two output corners for providing output signals, the impedances of said narrow and wide sides being in a predetermined ratio so that one of said corners will provide a signal proportional to the difference between said input signals and the other of said output corners will provide a signal proportional to the sum of said input signals.

References Cited in the file of this patent
UNITED STATES PATENTS

| | | |
|---|---|---|
| 2,749,519 | Kostriza et al. | June 5, 1956 |
| 2,818,549 | Adcock et al. | Dec. 31, 1957 |
| 2,913,686 | Fubini et al. | Nov. 17, 1959 |